US011966796B2

(12) United States Patent
Patel et al.

(10) Patent No.: US 11,966,796 B2
(45) Date of Patent: *Apr. 23, 2024

(54) ENHANCED INTEGRATION OF SPREADSHEETS WITH EXTERNAL ENVIRONMENTS

(71) Applicant: Microsoft Technology Licensing, LLC, Redmond, WA (US)

(72) Inventors: Keyur Rahul Patel, Seattle, WA (US); James Squires Masson, Seattle, WA (US); Joseph John McDaid, Seattle, WA (US); Arturo Goicochea Hoefken, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/945,417

(22) Filed: Sep. 15, 2022

(65) Prior Publication Data

US 2024/0069988 A1   Feb. 29, 2024

Related U.S. Application Data

(62) Division of application No. 17/898,321, filed on Aug. 29, 2022.

(51) Int. Cl.
*G06F 40/00* (2020.01)
*G06F 8/30* (2018.01)
(Continued)

(52) U.S. Cl.
CPC .............. *G06F 9/543* (2013.01); *G06F 8/315* (2013.01); *G06F 40/18* (2020.01)

(58) Field of Classification Search
CPC .............. G06F 40/18; G06F 9/54; G06F 8/315
See application file for complete search history.

(56) References Cited

U.S. PATENT DOCUMENTS 7,475,082 B1 *   1/2009   de Jong ................. G06F 9/541
                                            707/999.102
11,537,785 B1 *  12/2022  Goyal ..................... G06F 40/18
(Continued)

FOREIGN PATENT DOCUMENTS

| WO | 2005043406 A2 | 5/2005 | |
| WO | WO 2005043406 A2 * | 5/2005 | ........... G06F 17/246 |
| WO | 2020005603 A1 | 1/2020 | |

OTHER PUBLICATIONS

Ragavan et al. IUI '22: 27th International Conference on Intelligent User Interfaces GridBook: Natural Language Formulas for the Spreadsheet Grid pp. 345-368, 24 pages. 2022 (Year: 2022).*

(Continued)

*Primary Examiner* — Barbara M Level

(57) ABSTRACT

An enhanced integration of spreadsheet environments and external environments is disclosed herein that allows users to enter non-native statements directly into the cells of a worksheet so that external resources can be applied with respect to their values. In addition, a security model is disclosed whereby external functions referenced in the cells of a worksheet are executed in the context of a runtime environment that is secured apart from the spreadsheet application that hosts the worksheet. Various enhancements to the user experience are also disclosed that allow users to enter non-native statements in line with respect to the functional syntax that forms the basis of spreadsheet formulas.

20 Claims, 19 Drawing Sheets

(51) Int. Cl.
*G06F 9/54* (2006.01)
*G06F 40/18* (2020.01)

(56) References Cited

U.S. PATENT DOCUMENTS

| | | | | |
|---|---|---|---|---|
| 2002/0091871 | A1* | 7/2002 | Cahill | G06F 40/18 719/315 |
| 2005/0015714 | A1* | 1/2005 | Cahill | G06F 40/18 715/212 |
| 2006/0224946 | A1* | 10/2006 | Barrett | G06F 40/18 715/209 |
| 2007/0136652 | A1* | 6/2007 | Ellis | G06F 40/18 715/209 |
| 2013/0086064 | A1* | 4/2013 | Salch | G06F 40/18 707/E17.014 |
| 2014/0136936 | A1* | 5/2014 | Patel | G06F 16/972 715/212 |
| 2015/0309980 | A1 | 10/2015 | Glass et al. | |
| 2019/0095226 | A1* | 3/2019 | Saunders | G06F 8/76 |
| 2020/0004811 | A1* | 1/2020 | Gross | G06F 17/17 |
| 2020/0278850 | A1 | 9/2020 | Couillard et al. | |
| 2020/0285694 | A1* | 9/2020 | Nield | G06F 9/45504 |
| 2020/0302013 | A1* | 9/2020 | Stegmaier | G06F 40/18 |
| 2021/0081405 | A1* | 3/2021 | Zarras | G06F 16/2457 |
| 2022/0229974 | A1* | 7/2022 | Murphy | G06F 40/18 |
| 2023/0088670 | A1* | 3/2023 | Isner | G06F 8/425 717/137 |

OTHER PUBLICATIONS

Roberts; "Python Jupyter Notebooks in Excel"; Towards Data Science; Dec. 22, 2020; 10 pages; https://towardsdatascience.com/python-jupyter-notebooks-in-excel-5ab34fc6439#:~: text=First%20off%2C%20to%20run%20Python%20code%20in%20Excel,command%20line%20tool%20to%20install%20the%20Excel%20add-in%3A.

"Non-Final Office Action Issued in U.S. Appl. No. 17/945,472", dated Jul. 31, 2023, 37 Pages. (MS# 411980-US-DIV2).

"Non Final Office Action Issued in U.S. Appl. No. 17/898,321", dated Jul. 7, 2023, 34 Pages. (MS# 411980-US-NP).

"International Search Report and Written Opinion issued in PCT Application No. PCT/US2023/027694", dated Sep. 18, 2023, 11 Pages. (MS# 411980-WO-PCT).

Notice of Allowance mailed on Dec. 11, 2023, in U.S. Appl. No. 17/898,321, 6 pages.

Notice of Allowance mailed on Jan. 26, 2024, in U.S. Appl. No. 17/898,321, 02 pages.

Notice of Allowance mailed on Feb. 20, 2024, in U.S. Appl. No. 17/945,472, 05 pages.

Notice of Allowance mailed on Mar. 6, 2024, in U.S. Appl. No. 17/898,321, 02 pages.

\* cited by examiner

|   | A | B | C | D | E |
|---|---|---|---|---|---|
| 1 | Currency Code | Lookup Code | Conversion | | |
| 2 | KRW | USD:KRW | 1,290.72 | | |
| 3 | JPY | USD:JPY | 128.32 | | |
| 4 | USD | USD:USD | 1.00 | | |
| 5 | | | | | |
| 6 | Currency DF: | =PYO(%A2:C4%) | | | 703 |
| 7 | Property DF: | =PYO(%Table1[#All]%) | | | |
| 8 | Merged DF: | =PYO(%B7%.merge(%B6%,on='Currency code', how = 'left') | | | |
| 9 | US Revenue: | =PYO(df=%B8%) | | | |

Property Data | Analysis | + ~701

FIGURE 7C

| | A | B | C | D | E |
|---|---|---|---|---|---|
| 1 | Currency Code | Lookup Code | Conversion | | |
| 2 | KRW | USD:KRW | 1,290.72 | | |
| 3 | JPY | USD:JPY | 128.32 | | |
| 4 | USD | USD:USD | 1.00 | | |
| 5 | | | | | |
| 6 | Currency DF: | ◇ DATAFRAME | | | |
| 7 | Property DF: | ◇ DATAFRAME | | | |
| 8 | Merged DF: | =PY( | Campaign | Ad | Group |
| | US Revenue: | ####### | February, 2022 | KR1 | 13600 |

Property Data | Analysis | +

FIGURE 7G

ENHANCED INTEGRATION OF SPREADSHEETS WITH EXTERNAL ENVIRONMENTS

RELATED APPLICATIONS

This application is a divisional of, and claims the benefit of priority to, U.S. application Ser. No. 17/898,321, filed on Aug. 29, 2022, and entitled ENHANCED INTEGRATION OF SPREADSHEETS WITH EXTERNAL ENVIRONMENTS, the contents of which are hereby incorporated by reference in their entirety.

TECHNICAL FIELD

Aspects of the disclosure are related to the field of computer software applications and, in particular, to spreadsheet applications and associated technology.

BACKGROUND

Spreadsheet applications are computer software programs that allow users to store, organize, and analyze data in tabular form. The rows and columns of a representative worksheet define cells into which data and formulas may be entered. A given cell may simply hold data in it, such as a number or text string, or the cell may contain a formula that automatically calculates a value for the cell. Formulas can also employ functions that perform pre-defined calculations or return information about a spreadsheet. The functions may be pre-built functions provided as part of an application, or user-defined functions created by a user. User-defined functions allow users to create functions that do not already exist in their spreadsheet application. In an example, users can create user-defined functions for Microsoft® Excel spreadsheets using the Visual Basic for Applications (VBA) programming language.

More recently, proposed integrations between spreadsheets and external programming environments allow users to code user-defined functions in non-native procedural languages that can be called from within a spreadsheet macro. Such integrations allow users to leverage tools provided by non-native environments that are especially useful with respect to big data jobs. For instance, an integration between Excel and Python allows users to call Python functions from within the macros of a spreadsheet.

Unfortunately, executing non-native functions within the runtime context of a spreadsheet application presents security risks to the application and its general environment. In addition, passing large data sets between a spreadsheet and a non-native resource is a laborious task from a computational perspective and can be prohibitive for very large data sets. Finally, for such integrations to gain widespread acceptance, users must be relatively proficient with the intricacies of editing macros and properly configuring what would otherwise be an unfamiliar programming environment to users who lack the relevant domain expertise.

Overview

An enhanced integration of spreadsheet environments and external environments is disclosed herein that allows users to enter non-native statements directly into the cells of a worksheet so that external resources can be applied with respect to their values. In addition, a security model is disclosed whereby external functions referenced in the cells of a worksheet are executed in the context of a runtime environment that is secured apart from the spreadsheet application that hosts the worksheet. Various enhancements to the user experience are also disclosed that allow users to enter non-native statements in line with respect to the functional syntax that forms the basis of spreadsheet formulas.

In an implementation, a computer-implemented method of operating a spreadsheet application includes identifying a formula in a cell of a spreadsheet in which the formula includes a name of a function native to the spreadsheet application and includes an argument of the function. The method includes identifying a non-native statement in the argument of the function that has a reference to a portion of the spreadsheet. The method further includes sending a request for an external resource to process cell values from the portion of the spreadsheet referenced by the non-native statement, receiving a response to the request comprising a representation of an object generated by the external resource when processing the cell values, and updating the spreadsheet based on the representation of the object.

In another implementation, a computer-implemented method of operating an integration layer comprises receiving a call from a spreadsheet application, wherein the call identifies an external function named in a non-native statement in a cell of a spreadsheet, and a reference to content in the spreadsheet expressed in a format native to the spreadsheet. The method continues with generating code to supply to an external resource, wherein the code includes a name of the external function and includes a reference to the content expressed in a format native to the external resource. The method also includes supplying the code to the external resource to obtain a result produced by the external resource when executing the external function with respect to the content. The integration layer then returns a representation of the result to the spreadsheet application.

In yet another implementation, a computer-implemented method of providing a secure integration between a spreadsheet and an external resource includes instantiating a secure runtime environment for a duration that a spreadsheet is open in a context of a spreadsheet application, wherein the secure runtime environment is external with respect to the context of the spreadsheet application. For the duration that the spreadsheet is open, the method includes receiving calls from the spreadsheet application that identify external functions named in non-native statements of cells of the spreadsheet and executing the external functions in the secure runtime environment. The secure runtime environment may then be shut down when the spreadsheet closes.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

FIGS. 7A-7G illustrate a user experience in an implementation.

DETAILED DESCRIPTION

Figure 1A:
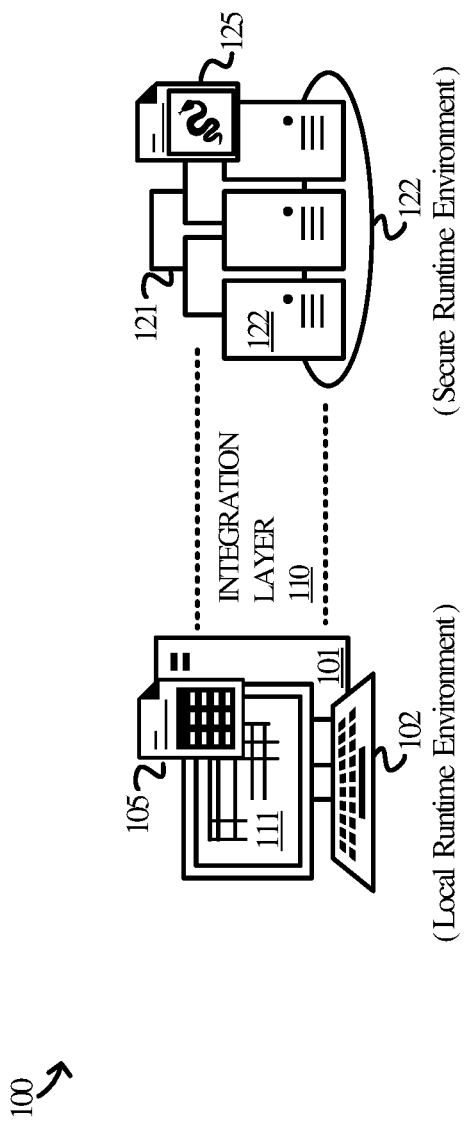
FIGS. 1A-1C illustrate an operational environment in an implementation.

Various implementations are disclosed herein that relate to spreadsheets and features for integrating an external programming language (e.g., Python) with a spreadsheet application functional formula language. The disclosed integrations enable users to create and share Python enabled spreadsheets for inline data manipulation and analysis, the ability to create custom plots and call Python custom libraries. While the present disclosure makes reference to Python, it may be appreciated that the concepts apply to any external programming language of any environment such as JavaScript, Perl, and the like.

The integrations disclosed herein support advanced analytics such as the use in Excel of Python libraries to quickly clean up messy data, explore the relationships within the data, and use sophisticated AI-powered libraries to analyze the data and make predictions. The integrations also allow for improved data explanations and visualizations that leverage Python's custom calculations and plots in the context of Excel. Moreover, the integrations allow spreadsheet worksheets to be refreshed quickly and remain up to date, while doing so in a manner that runs securely at scale.

In one aspect, as a user initiates a gesture to switch into "Code editing mode" by typing=PY( ), the formula editing behavior of the user interface will change. Namely, the user interface changes with respect to the typing of Enter and Tab keys that will take on behavior that is exists in external code editors within the Excel context. In addition, code editing behavior will follow that of Python code, bringing in an understanding of python libraries, as well as Excel objects. The user interface also allows users to seamlessly toggle back and both between normal formula editing mode, and a non-native editing mode using natural and familiar user gestures (i.e., press backspace when there is no code left to toggle out). Such an advance allows users to bring in their own familiar ways of working outside of Excel in programming languages contextually into the application. The editing experience is improved by the user not having to switch between two different tools—typically a spreadsheet application and a code editor of either a macro programming environment or an external programming environment.

In another aspect, "Python Variable Types" (or PVTs) allow Python objects to be returned and represented to a spreadsheet. The PVT is rendered in a cell as an icon to indicate that a rich value is contained in the cell (and correspondingly that the cell contains/represents more than just the value it shows). The PVT also includes cell text that describes the rich value. Optionally, the PVT may include card rendering that displays a card with supplemental information made available when the icon is clicked. Finally, a PVT can be referenced via calc properties that are accessible through the grid. For example, using dot notation, users will be able to reference both the 'type' and 'str' properties of a PVT.

In yet another aspect, Python exceptions may be displayed as an error string: "#External!". The #External Error represents a new error type within a spreadsheet application, which is used to indicate that an error occurred external to the spreadsheet environment. #External! errors may have both the ability to have a custom error message, as well as a custom action, which may provide specific gestures for fixing the external error. This allows users to know specifically the origin of the error did not come from Excel and provides greater clarity to troubleshoot and diagnose errors in spreadsheets.

In another aspect, a syntax allows grid contexts to be referenced from a Python formula. In an example, percent symbols bracket a cell range to indicate that the contents of the range are to be supplied to a Python environment. The cell references may be adjusted automatically if a row or column is entered, or if the formula is copy and pasted. The cell references may also be highlighted during formula editing, and they may be automatically inserted into a Python function when a user selects the reference during formula editing using the mouse, stylus, or the like.

A security layer is also proposed that includes hypervisor-based isolation of Python code running in a cloud environment. The security layer is able to orchestrate and marshal requests from multiple spreadsheet applications and environments. The security layer may also manage lifecycle and management from a spreadsheet context, including first invocation in a session. The security can pipe errors from a Python runtime back to a spreadsheet application. The security application also allows for toggling the settings of an integration (i.e., ability for Python code to make network requests and the ability for the runtime to have two-way communication for the runtime).

Referring now to the drawings, FIG. 1A illustrates an operational environment 100 in an implementation of enhanced integrations of native spreadsheet environments with external resources such as—but not limited to—Python. Operational environment 100 includes computing device 101, integration layer 110, and online service 121. Computing device 101 provides a local runtime environment 102 for spreadsheet applications and other productivity software, whereas online service 120 provides a secure runtime environment for external resources connected to assets in local runtime environment 101 by integration layer 110. (Although computing device 101 are illustrated as remote from each other and on distributed devices in FIG. 1A, it may be appreciated that they could be implemented in a co-located manner, and even on a single device.) Integration layer 110 provides a connection between spreadsheet workbook 105 and external resource 121 and may be implemented via one or more components of local runtime environment 101 and secure runtime environment 122.

Computing device 101 is representative any computing device capable of running a spreadsheet application, examples of which include desktop and laptop computers, tablet computers, mobile phones, and the like. Examples of suitable spreadsheet applications include locally installed and executed applications, web-based applications that are executed in the context of a local web-browser application, and any variation or combination thereof. In some implementations, representative spreadsheet applications may be embedded in other applications and in accordance with numerous other frameworks including embedded frameworks and distributed frameworks.

Online service 121 provides one or more computing services to end points such as computing device 101. Online service 121 employs one or more server computers co-located or distributed across one or more data centers connected to computing device 101. Examples of such servers include web servers, application servers, virtual or physical (bare metal) servers, or any combination thereof. Computing device 101 communicates with online service 121 via one or more internets and intranets, the Internet, wired and wireless networks, local area networks (LANs), wide area networks (WANs), and any other type of network or combination thereof.

Figure 1B:
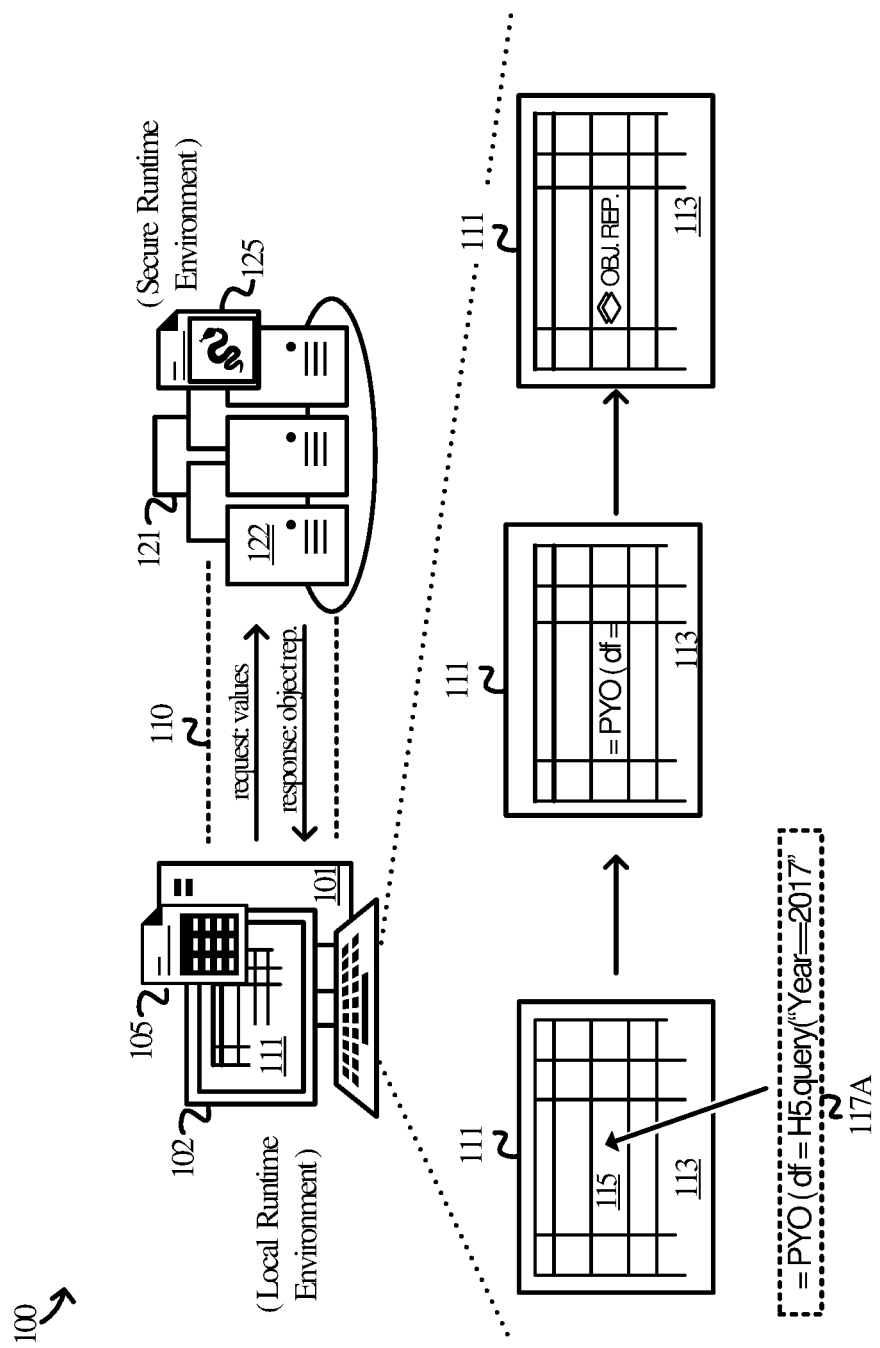

Referring to an exemplary workflow in FIG. 1B, computing device 101 displays a user interface 111 to a spreadsheet application. Spreadsheet workbook 105 is representative of spreadsheet workbooks opened in the context of the spreadsheet application on computing device 101. Computing device 101 renders a view 113 a worksheet of spreadsheet workbook 105 in user interface 111. The worksheet includes rows and columns that define the cells of the worksheet. A user engaged with user interface 111 supplies user input 117A in cell 115. User input 117A includes a string that defines a formula. The formula includes a function name (or abbreviation) and arguments to the function. Here, the function abbreviation is "PYO," while the arguments include a string "df=H5.query("Year==2017")." The argument string identifies a cell range (H5) within a procedural statement. The procedural statement represents Python code that may be executed in secure runtime environment 122.

When the user commits the user input 117A to the cell (usually by hitting the character return key—or the "enter" button), computing device 101 via integration layer 110 sends a request to execute the procedural function that is indicated in the procedural statement of user input 117A. In addition, the request identifies the values referenced by the cell range in user input 117A (the value of cell H5).

The request is translated by integration layer 110 into procedural code that is executed in secure runtime environment 122. The code is part of a program 125 that itself is representative of one or more executable components of secure runtime environment 122. Examples include program files, objects, and the like. Secure runtime environment 122 executes program 125 and returns an object identifier (ID) to integration layer 110. Integration layer 110 returns the object ID to local runtime environment 102, which provides the object ID to the spreadsheet application. The spreadsheet application then populates cell 115 with a representation of the object ID.

Figure 1C:
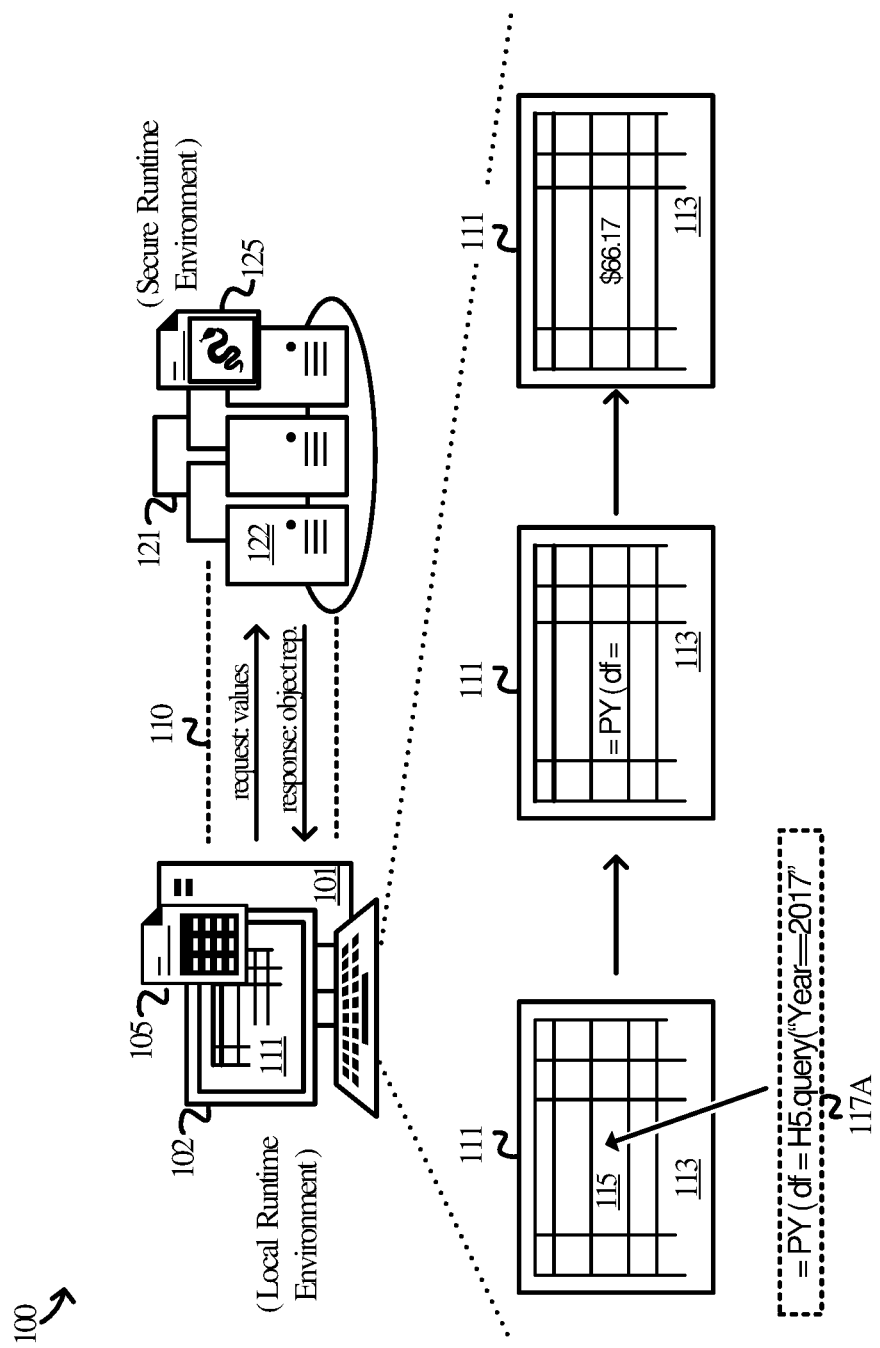

FIG. 1C illustrates a slightly different workflow in which a value is returned rather than (or in addition to) an object ID. In operation, computing device 101 displays user interface 111. A user engaged with user interface 111 supplies user input 117A in cell 115. User input 117A includes a string that defines a formula. The formula includes a function name (or abbreviation) and arguments to the function. Here, the function abbreviation is "PY," while the arguments include a string "df=H5.query("Year==2017")." The argument string identifies a cell range (H5) within a procedural statement. The procedural statement represents Python code that may be executed in secure runtime environment 122.

When the user commits the user input 117A to the cell, computing device 101 via integration layer 110 sends a request to execute the procedural function that is indicated in the procedural statement of user input 117A. In addition, the request identifies the values referenced by the cell range in user input 117A (the value of cell H5).

The request is translated by integration layer 110 into procedural code that is executed in secure runtime environment 122. Secure runtime environment 122 executes program 125 and returns a value produced by executing the code to integration layer 110. Integration layer 110 returns the value to local runtime environment 102, which provides the value to the spreadsheet application. The spreadsheet application then populates cell 115 with the value (e.g., $66.17).

Figure 2:
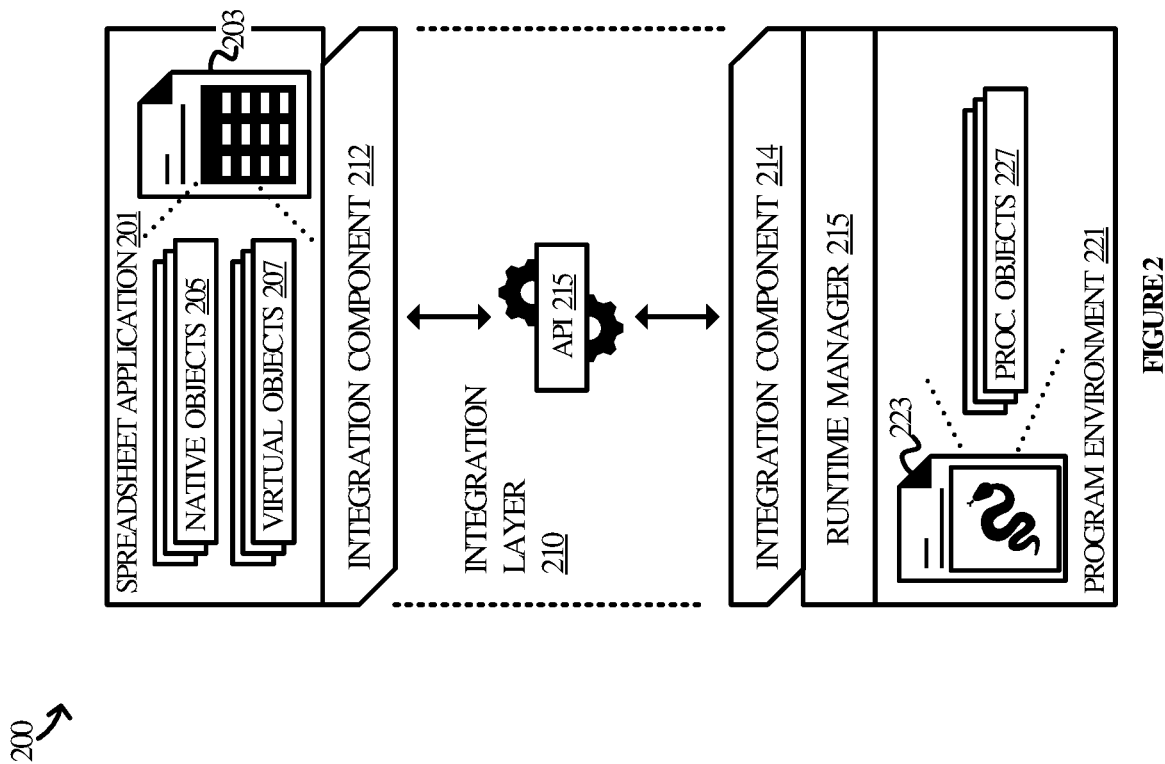
FIG. 2 illustrate an operational architecture in an implementation.

FIG. 2 illustrates an operational architecture 200 in an implementation, which is representative of a software architecture that may be employed to provide the enhanced integrations disclosed herein. For example, operational architecture 200 may be employed in the context of operational environment 100 in FIG. 1. Operational architecture 200 includes spreadsheet application 201 and runtime manager 215, which communicate with each other via integration layer 210.

Spreadsheet application 201 is representative of any spreadsheet application capable of hosting spreadsheets and communicating with an external resource via an integration layer. Workbook 203 is representative of a spreadsheet workbook that may be opened by spreadsheet application 201, and with respect to the calculation engine and other components of spreadsheet application 201 perform operations. Workbook 203 includes native objects 205 and virtual objects 207. Native objects 205 are representative of elements of the workbook 203 such as individual worksheet and cell ranges within each worksheet. Virtual objects 207 represent handles or other such links into program environment 221 that correspond to objects that are created at runtime as discussed in more detail below.

Integration component 212 is representative of any software component capable of communicating via an application programming interface (API) with a counterpart component in a secure runtime environment. Integration component 212 may be a component of spreadsheet application 201, or it may be a resource provided by the local runtime environment of spreadsheet application 201. Here, integration component 212 communicates via API 215 with integration component 214. Integration component 214 is representative of any software component capable of communicating via an API with a counterpart component in an application environment. Integration component 214 may be a component of runtime manager 215 or it may be a resource provided by the local runtime environment of program environment 221.

Runtime manager 215 is representative of a software component, module, or application that manages the operations of program application 221. Runtime manager 215 interfaces with integration component 214 to send and receive calls from integration component 212. In addition, runtime manager 215 interfaces with program environment 221 to launch program resources in furtherance of handling calls received by integration component 214.

Program environment 221 is representative of one or more software components, modules, and/or programs that function to execute procedural code submitted to the environment. Examples include interpreters capable of interpreting such code, as well as a runtime engine capable of executing the interpreted result. Examples of program environment 221 include the Python runtime environment as well as the Java runtime engine. Program environment 221 includes various objects created and used in the process of interpreting and executing code including program file 223 and process objects 227. Process objects 227 are representative of the objects created when executing code. Virtual objects 207 created by spreadsheet application 201 correspond to one or more of process objects 227.

Figure 3:
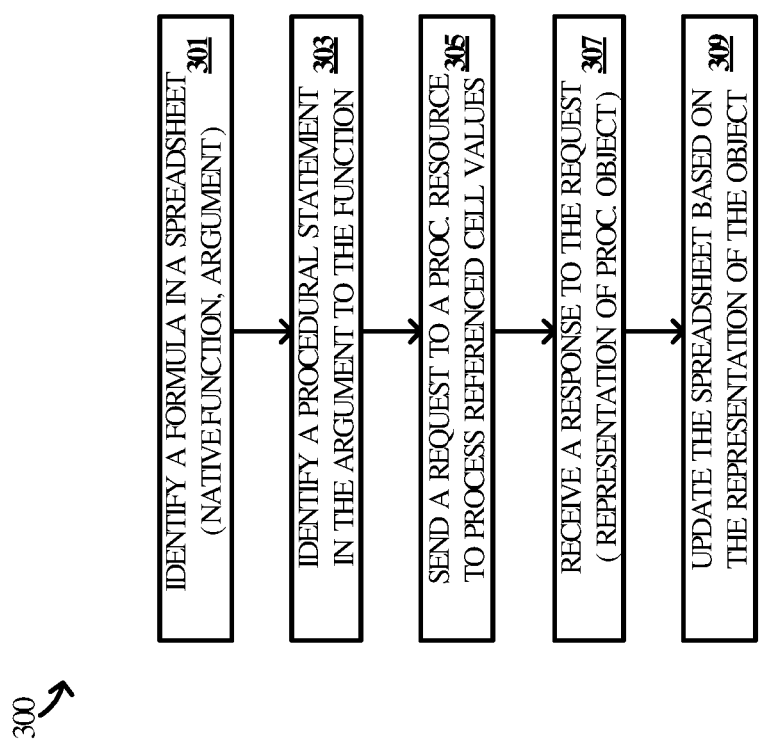
FIG. 3 illustrates an execution process in an implementation.
Figure 8:
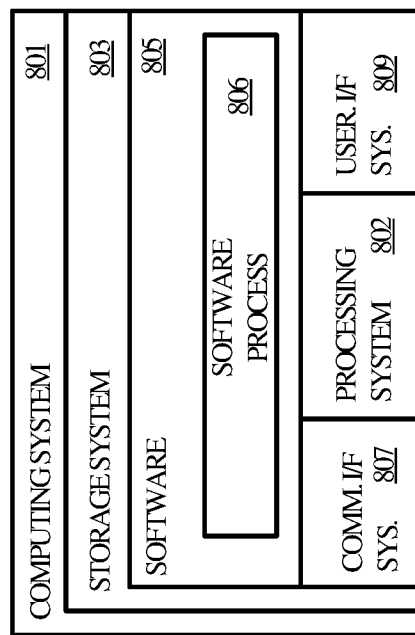
FIG. 8 illustrates a computing system suitable for implementing the various operational environments, architectures, processes, scenarios, and sequences discussed below with respect to the other Figures.

FIG. 3 illustrates a local process 300 employed by spreadsheet application 201 on a suitable computing device, of which computing device 801 in FIG. 8 is representative. Local process 300 is implemented in program instructions in the context of software application 201. The program instructions direct the computing device to operate as follows, referring parenthetically to the steps in FIG. 3.

In operation, spreadsheet application 201 identifies a formula in a cell of a spreadsheet that includes a name of a function native to the spreadsheet application and an argument of the function (step 301). Next, spreadsheet application 201 identifies a non-native statement in the argument of the function that includes a reference to a portion of the spreadsheet.

Spreadsheet application 201 sends a request for an external resource to process cell values from the portion of the spreadsheet referenced by the non-native statement (step 305). The external resource generates a representation of an object when processing the cell values and sends a response that includes the representation. Spreadsheet application 201 receives the response (step 307), which includes the representation of the objection, and updates the spreadsheet based on the representation of the object (step 309).

Figure 4:
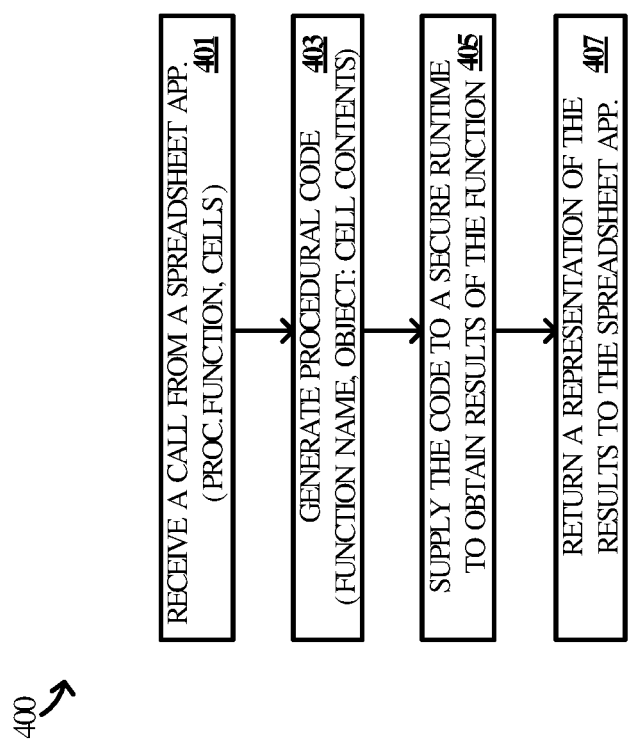
FIG. 4 illustrates an integration process in an implementation.

FIG. 4 illustrates integration process 400 employed by integration component 212 on a suitable computing device (e.g., computing device 801). Integration process 400 may be implemented in program instructions in the context of any of the software applications, modules, components, or other such elements of the computing device. The program instructions direct the computing device to operate as follows, referring parenthetically to the steps in FIG. 4.

In operation, integration component 212 receives a call from a spreadsheet application (step 401). The call identifies an external function named in a non-native statement in a cell of a spreadsheet, and a reference to content in the spreadsheet expressed in a format native to the spreadsheet. Integration component 212 generates code to supply to an external resource (step 403). The code includes a name of the external function and includes a reference to the content expressed in a format native to the external resource.

Integration component 212 supplies the code to the external resource (Step 405) to obtain a result produced by the external resource when executing the external function with respect to the content. Integration component 212 then returns a representation of the result to the spreadsheet application (Step 409).

Figure 5:
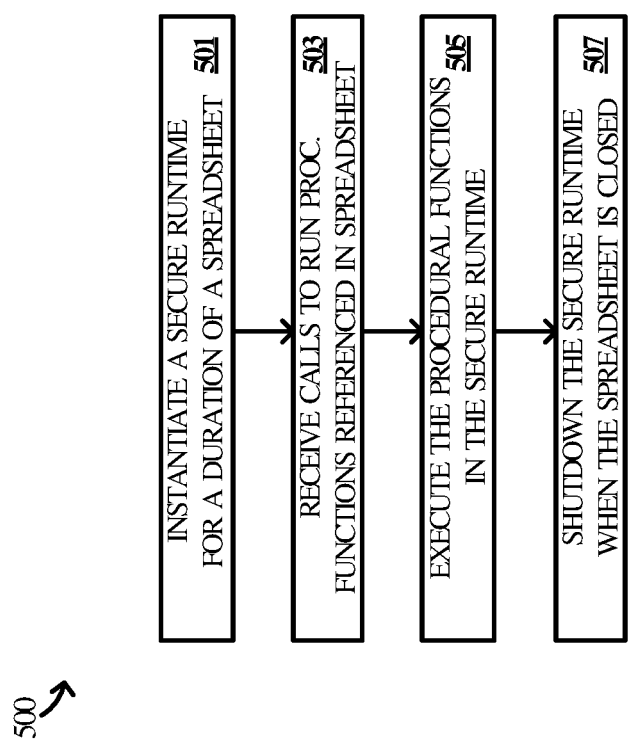
FIG. 5 illustrates a security process in an implementation.

FIG. 5 illustrates security process 500 employed by runtime manager 215 on a suitable computing device (e.g., computing device 801). Security process 500 may be implemented in program instructions in the context of any of the software applications, modules, components, or other such elements of the computing device. The program instructions direct the computing device to operate as follows, referring parenthetically to the steps in FIG. 5.

In operation, runtime manager 215 instantiates a secure runtime environment for a duration that a spreadsheet is open in a context of spreadsheet application 201 (Step 501). The secure runtime environment is external with respect to the context of the spreadsheet application. For the duration that the spreadsheet is open, runtime manager 215 receives calls from the spreadsheet application that identify external functions named in non-native statements of cells of the spreadsheet (step 503). Runtime manager 215 executes the external functions in the secure runtime environment (step 505) and then shuts down the secure runtime when the spreadsheet closes (step 507).

FIGS. 6A-6D illustrate an operational scenario 600 that is representative of an application of local process 300, integration process 400, and security process 500, referring to the elements of operational architecture 200 for purposes of clarity. It may be appreciated that, while illustrated as an extended operational scenario, the illustrated steps could be implemented as sub-processes. For example, the sub-steps illustrated in FIG. 6A could be implemented independently with respect to the steps illustrated in FIGS. 6B-6D.

Figure 6A:
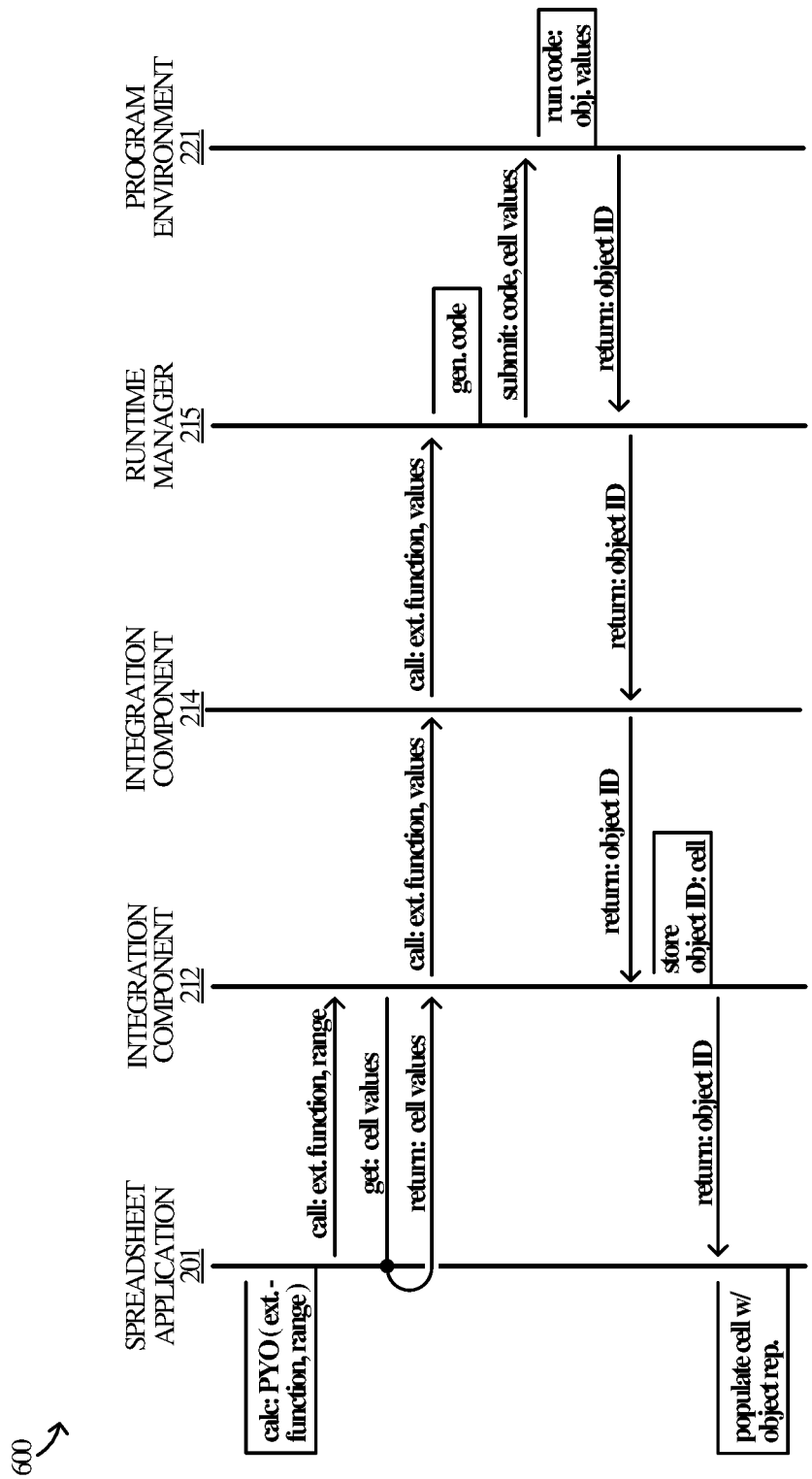
FIGS. 6A-6D illustrate an operational scenario in an implementation.

Beginning with FIG. 6A, a user enters a formula into a cell of a worksheet in workbook 205. It is assumed for exemplary purposes that the formula identifies a native function (PYO) and includes an argument that itself includes a non-native statement. The non-native statement identifies an external function and a cell range.

The calculation engine of spreadsheet application 201 encounters the formula and, upon detecting the PYO-function, calls into integration component 212. The API call identifies the external function expressed in the argument of the function, as well as the cell range. Integration component 212 responsively reads the values of the cell range and makes a call to integration component 214. The API call to integration component 214 includes the name of the external function, as well as the value(s) from the cell range.

Integration component 214 receives the API call and passes the request to runtime manager 215. Runtime manager 215 generates code that can be executed by program environment 221. The code identifies the (external) function and creates an object to hold the values from the referenced cell range. Runtime manager 215 submits the code to program environment 221, which interprets and executes the code.

As part of executing the code, program environment 221 instantiates the object and returns an identifier (ID) to runtime manager 215 for the object. Program environment 221 also produces updated values based on the function that was called to perform an operation(s) on the values. However, the values need not be returned because the PYO-function does not call for the values to be returned. Rather, the PYO-function only requests the object ID, to avoid passing data back and forth between environments.

As a result, the object ID is returned by runtime manager 215 to integration component 214, and onward to integration component 212. Integration component 212 tracks its requests and, upon receiving the reply from integration component 214, knows that the object ID is associated with the original cell that holds the formula. Integration component 212 therefore stores the object ID in association with the identity of the cell for later reference. Integration component 212 also provides the object ID to spreadsheet application 201.

Spreadsheet application 201 receives the object ID and updates the subject worksheet accordingly with a representation of the object corresponding to the ID. For example, spreadsheet application 201 may render a visual graphic of an object in the cell. In addition, the graphic may include meta data that identifies the object ID. The graphic alerts the user to the fact that the cell holds a virtual object. The virtual object is a representation of the actual object created by program environment 221 when executing the code.

Figure 6B:
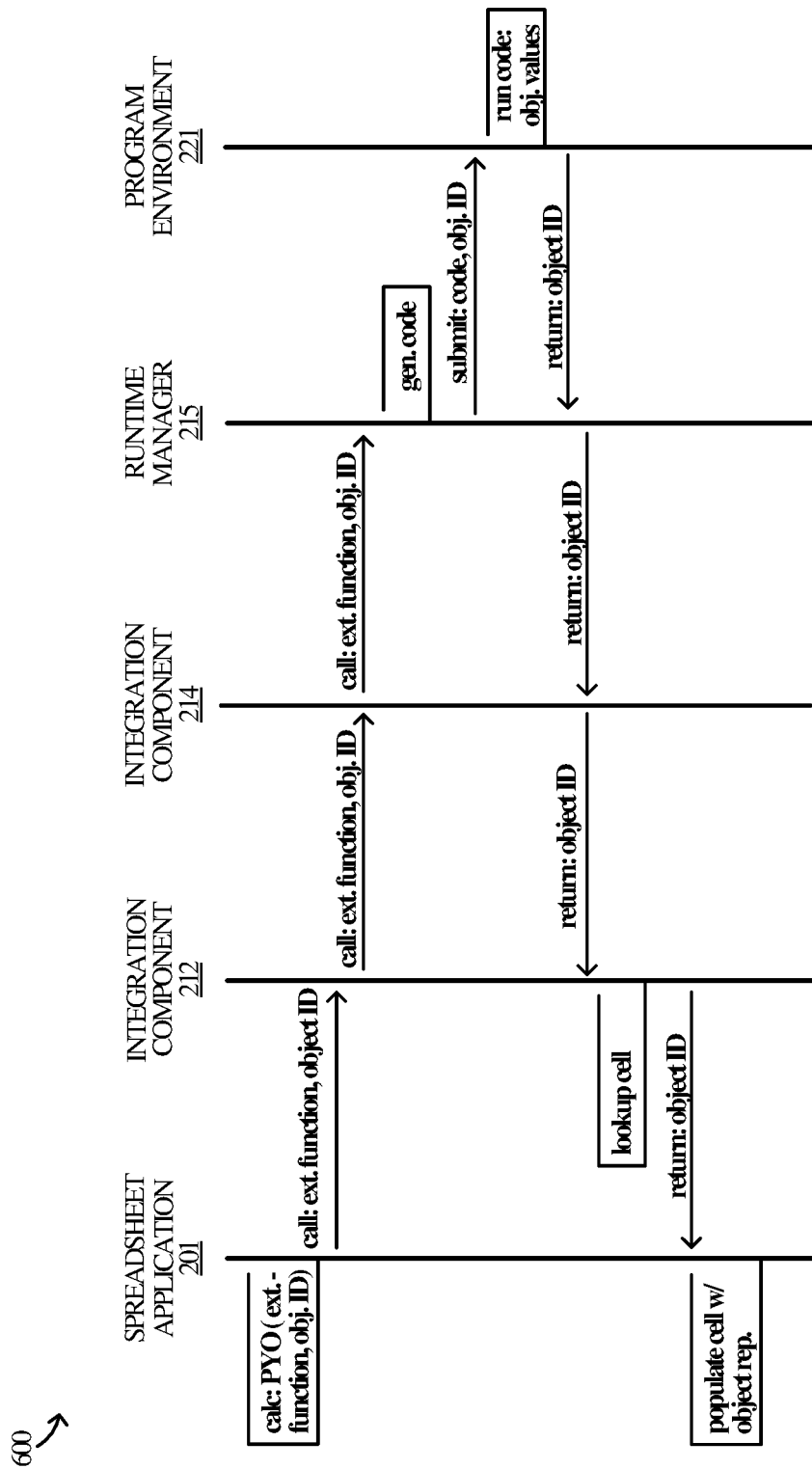

Continuing to FIG. 6B, the calculation engine of spreadsheet application 201 again encounters the formula in the same cell. However, during this cycle, the formula now includes a reference to the virtual object. Accordingly, upon detecting the PYO-function, spreadsheet application 201 calls into integration component 212. The API call identifies the external function expressed in the argument of the function, as well as the object ID of the virtual object—instead of cell range, as in the previous cycle illustrated in FIG. 6A. In addition, because the object ID is passed instead of the cell range, integration component 212 need not read the values of the cell range. Rather, integration component 212 makes an API call to integration component 214 that includes the name of the external function and the object ID.

Integration component 214 receives the API call and passes the request to runtime manager 215. Runtime manager 215 generates (or reuses) code that can be executed by program environment 221. The code identifies the (external) function and the object, which was already created during the last cycle. Runtime manager 215 submits the code to program environment 221, which interprets and executes the code against the values bound to the actual object.

As part of executing the code, program environment 221 produces updated values based on the function that was called to perform an operation(s) on the values. However, the values need not be returned because the PYO-function does not call for the values to be returned. Rather, the PYO-function only requests the object ID (which may be the same or a different object ID), to avoid passing data back and forth between environments.

The object ID is returned by runtime manager 215 to integration component 214, and onward to integration component 212. Integration component 212 tracks its requests and, upon receiving the reply from integration component 214, knows that the object ID is associated with the original cell that holds the formula. Integration component 212 therefore provides the object ID to spreadsheet application 201.

Spreadsheet application 201 receives the object ID and updates the subject worksheet accordingly with an updated representation of the object corresponding to the ID. For example, spreadsheet application 201 may render an updated version of the visual graphic of an object in the cell to indicate that its values have changed. Alternatively, there may be no need to visually depict an update to the object representation. Rather, other cells that depend on the subject cell may change their values or appearance depending on their respective formulas and functions.

Figure 6C:
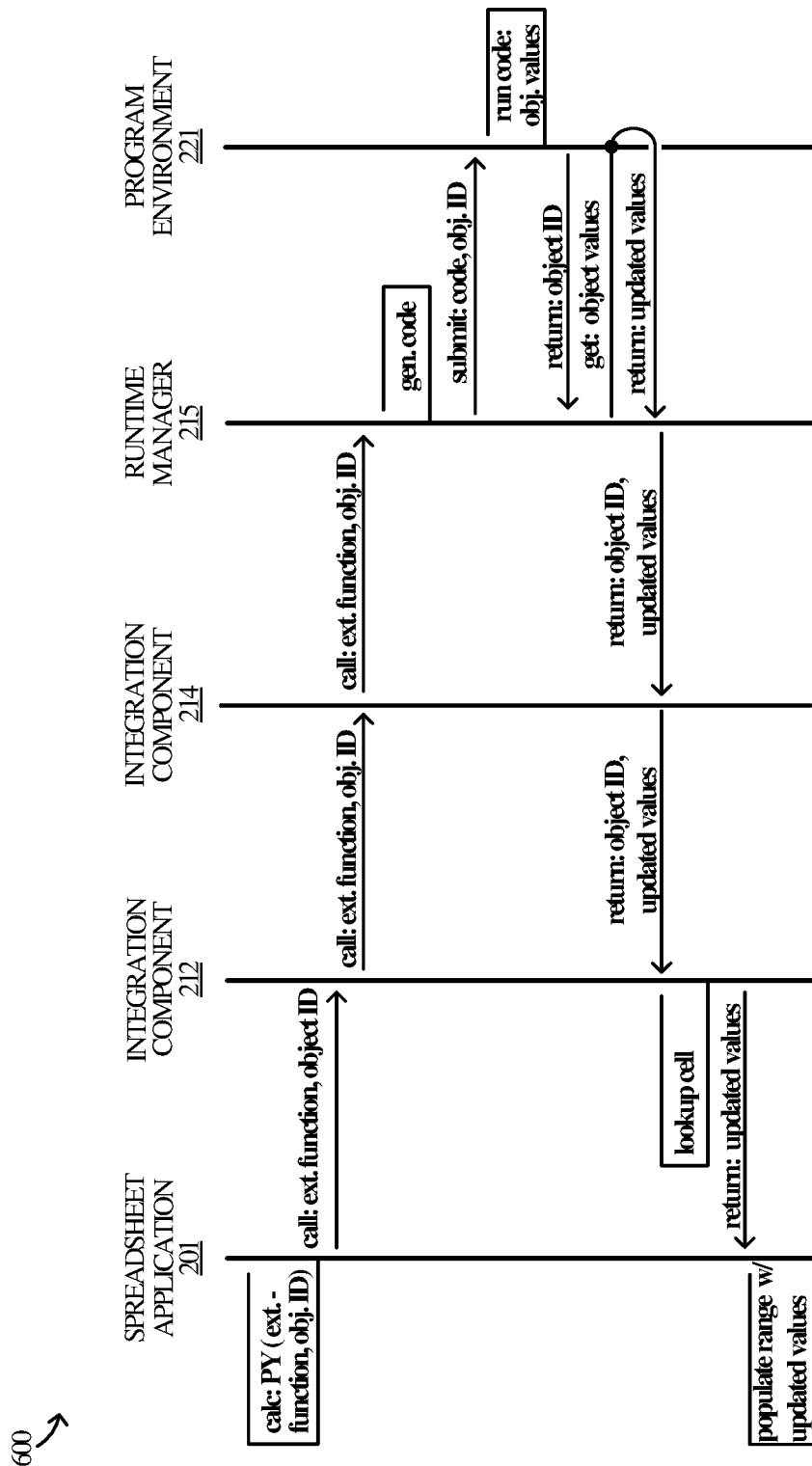

In FIG. 6C, the user enters a formula into a different cell of a worksheet in workbook 205. It is assumed for exemplary purposes that the formula identifies a native function (PY) and includes an argument that itself includes a non-native statement. The non-native statement identifies an external function and the object ID returned in FIGS. 6A-6B.

The calculation engine of spreadsheet application 201 again encounters the formula in the new cell. However, during this cycle, the formula now includes a reference to the virtual object. In addition, the PY-function is a different function than the PYO-function and signals to spreadsheet application 201 to obtain actual values. Accordingly, upon detecting the PY-function, spreadsheet application 201 calls into integration component 212. The API call identifies the external function expressed in the argument of the function, as well as the object ID of the virtual object—instead of cell range, as in the previous cycle illustrated in FIG. 6A. In addition, because the object ID is passed instead of the cell range, integration component 212 need not read the values of the cell range. Rather, integration component 212 makes an API call to integration component 214 that includes the name of the external function and the object ID.

Integration component 214 receives the API call and passes the request to runtime manager 215. Runtime manager 215 generates (or reuses) code that can be executed by program environment 221. The code identifies the (external) function and the object, which was already created during the last cycle. Runtime manager 215 submits the code to program environment 221, which interprets and executes the code against the values bound to the actual object.

As part of executing the code, program environment 221 produces updated values based on the function that was called to perform an operation(s) on the values. Program environment 221 returns the object ID to runtime manager 215. However, because the PY-function calls for obtaining values, runtime manager 215 requests the values from programming environment 221.

The object ID and the object values are returned by runtime manager 215 to integration component 214, and onward to integration component 212. Integration component 212 passes the updated values to spreadsheet application 201, allowing spreadsheet application 201 update the values in the cell or range of cells affected by the formula. In this manner, the actual values produced by executing the external function in program environment 221 can be persisted in the cells of the worksheet.

Figure 6D:
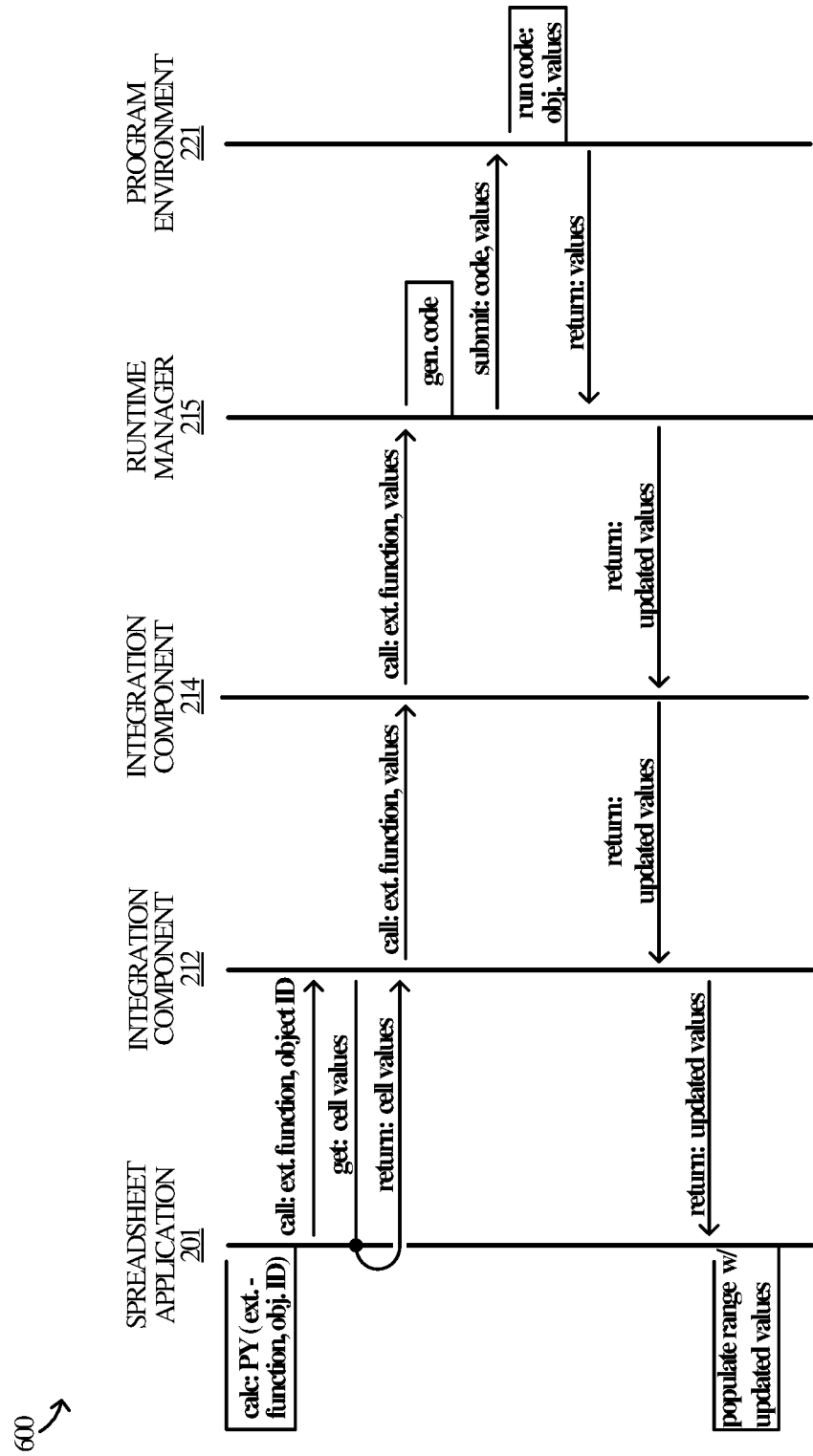

In FIG. 6D, the user enters another formula into yet another cell of a worksheet in workbook 205. It is assumed for exemplary purposes that the formula identifies a native function (PY) and includes an argument that itself includes a non-native statement. The non-native statement identifies an external function and a cell range.

The calculation engine of spreadsheet application 201 encounters the formula in the new cell, which includes a non-native statement in its argument. The non-native statement includes a reference to a non-native function and a cell range native to the spreadsheet. In addition, the PY-function is a different function than the PYO-function and signals to spreadsheet application 201 to obtain actual values.

Accordingly, upon detecting the PY-function, spreadsheet application 201 calls into integration component 212. The API call identifies the external function expressed in the argument of the function, as well as the cell range. Integration component 212 responsively reads the data in the cell range and makes an API call to integration component 214 that includes the name of the external function and the cell values.

Integration component 214 receives the API call and passes the request and the values to runtime manager 215. Runtime manager 215 generates code that can be executed by program environment 221. The code identifies the function and a new object that will hold the values. Runtime manager 215 submits the code and the values to program environment 221, which interprets and executes the code against the values bound to the actual object.

As part of executing the code, program environment 221 produces updated values based on the function that was called to perform an operation(s) on the values. Program environment 221 returns an object ID to runtime manager 215. However, because the PY-function calls for obtaining values, runtime manager 215 requests the values from programming environment 221.

The object values are returned by runtime manager 215 to integration component 214, and onward to integration component 212. Integration component 212 passes the updated values to spreadsheet application 201, allowing spreadsheet application 201 update the values in the cell or range of cells affected by the formula. In this manner, the actual values produced by executing the external function in program environment 221 can be persisted in the cells of the worksheet.

FIGS. 7A-7E illustrate various aspects of a user experience 700 provided in the context of a user interface to a spreadsheet application (e.g., spreadsheet application 201). User experience 700 includes a user interface 701 to a worksheet in a spreadsheet workbook. User interface 701 includes columns 705 and rows 707 that define the cells of the worksheet. Cell 703 located at position E2 in the grid is representative of a cell and their naming convention.

Figure 7A:
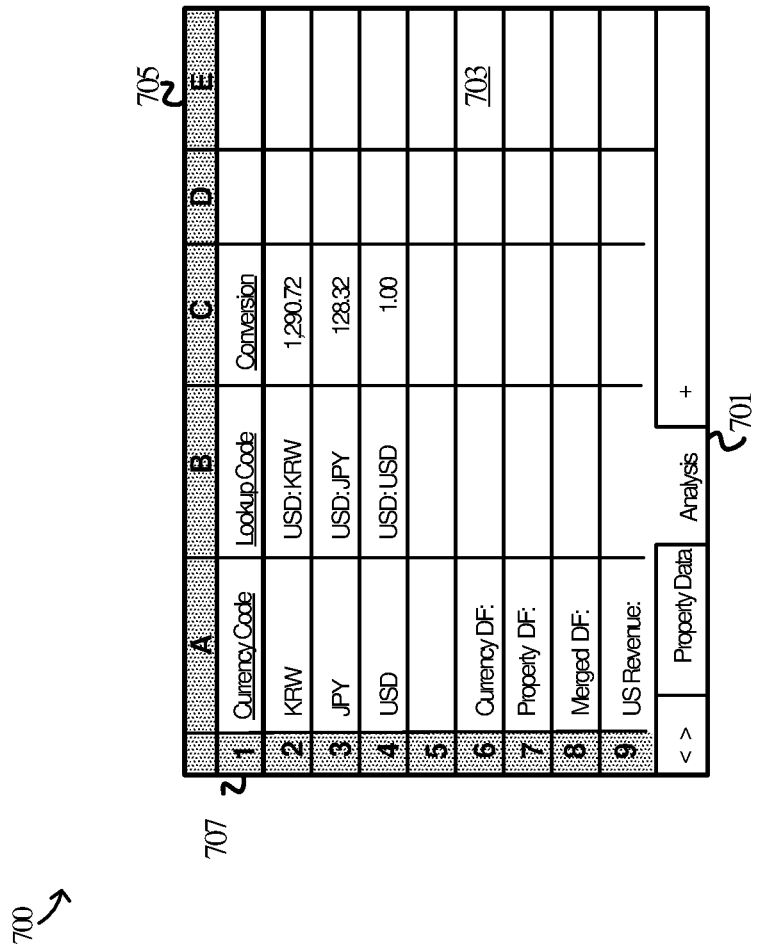

User experience 700 begins in FIG. 7A with a table of values in cell range A1:C4. The first row of the table includes header values, while the body of the table includes values. Cells C6, C7, C8, and C9 include labels for the results of formulas that will be entered into other cells in the context of user experience 700 and FIGS. 7B-7E.

Figure 7B:
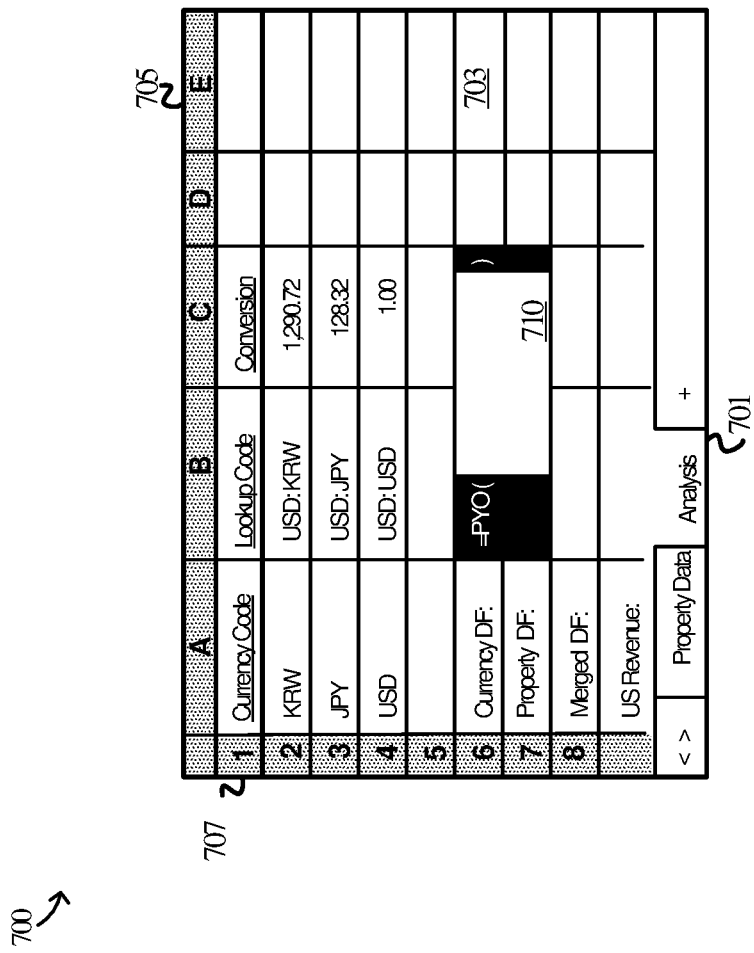

In FIG. 7B, a user supplies user input in cell B6 of the grid. In response to the user typing "PY" or "PYO," the spreadsheet application automatically surfaces a formula module 710 for receiving non-native statements. The user can enter arguments to the PYO function (or PY function) that can be parsed and debugged by the spreadsheet application, even though the statements are not native to the application.

It is assumed for exemplary purposes that the user enters formulas into each of the cells that include non-native statements, which is illustrated in FIG. 7C. The non-native statements themselves reference non-native functions with respect to ranges of the worksheet. For example, the formula is cell B6 references the range A2:C4. However, the range is referenced within percentage symbols. The percentage symbols indicate to the spreadsheet application that the range is not to be acted upon directly by the calculation engine. Rather, the range is to be passed to an integration component of the application that calls out to a secure runtime environment per FIGS. 6A-6D. The result of the formula in cell B6 is to pass the table values to the secure runtime environment.

The formula in cell B7 references a table in a different worksheet (the sheet named "Property Data"). However, as with the formula in cell B6, the formula indicates to the spreadsheet application that the data in the table is to be uploaded to the secure runtime environment. In cell B8, the formula includes references to cells B6 and B7, as well as a procedural statement that includes a merge function. The procedural statement is a non-native statement, and the merge function is a non-native function. The formula causes the spreadsheet application to request a merge of the objects created by the formulas in cells B6 and B7. Cell B9 includes another PYO-function the performs a calculation on the merged table created by the formula in cell B8.

Figure 7D:
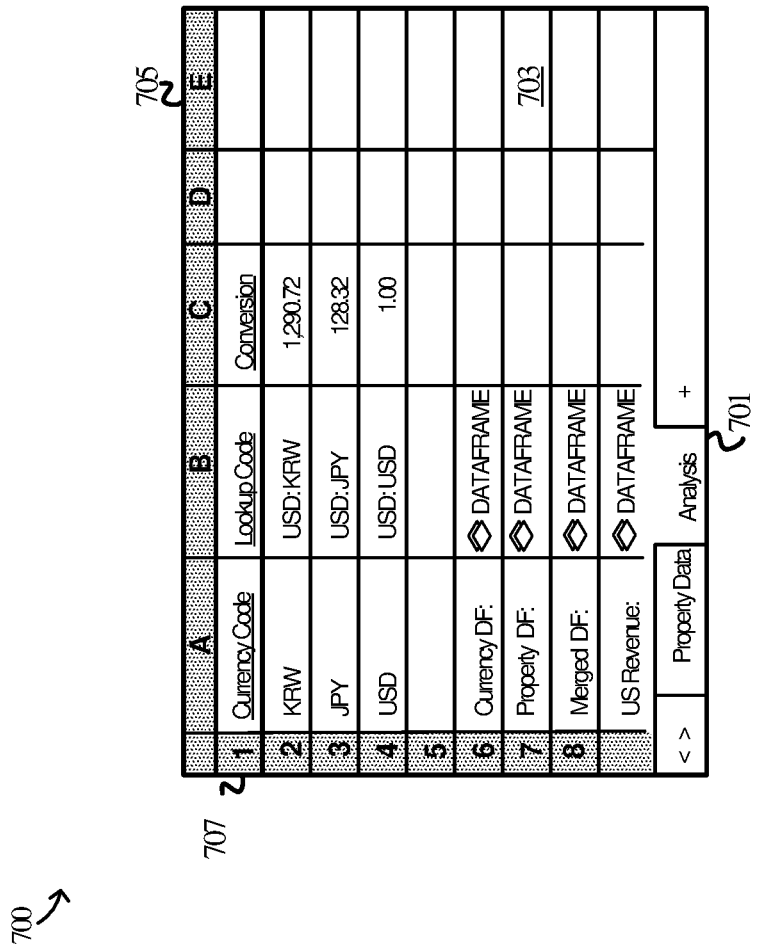

When the calculation engine encounters the formulas in cells B6-B9, the PYO-function causes the requests submitted to the secure runtime environment to return object IDs rather than calculated values. Accordingly, cells B6-B9 in FIG. 7D are populated with representations of the objects. Here, it is assumed for exemplary purposes that the objects created in the secure runtime are Python data frames. Accordingly, the object representations are symbolic representations of Python data frames to indicate to the user that objects exist in the secure runtime that hold the values requested in the body of their formulas.

Figure 7E:
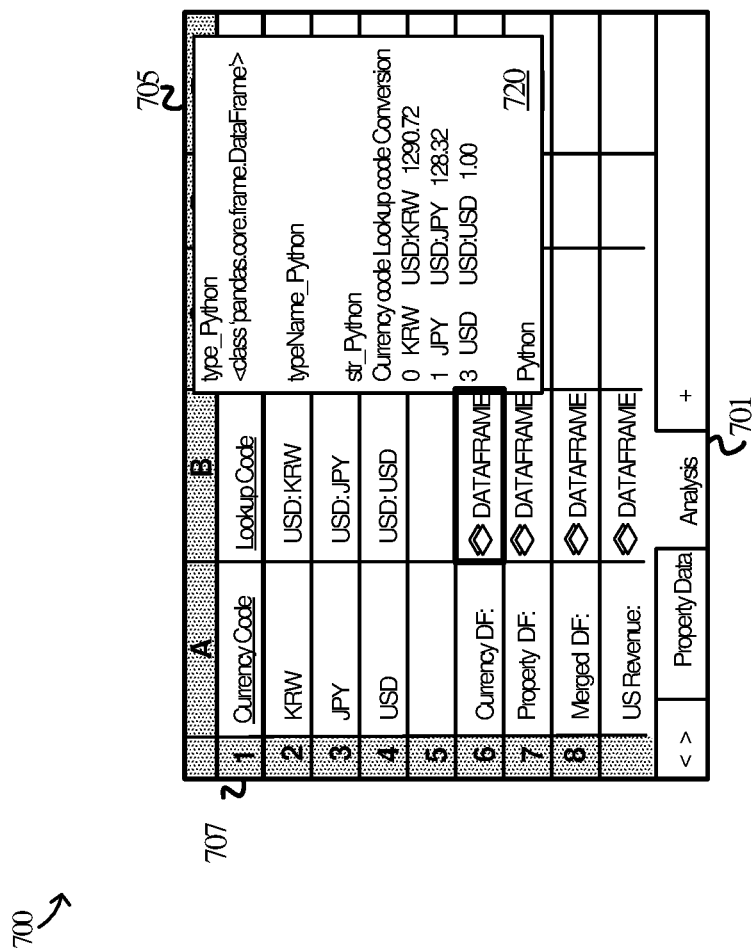

FIG. 7E illustrates a card 720 that provides a view into the external objects referenced by their representations in the cell grid. For example, the view displayed in card 720 includes the type of an object, the name of the object, and at least some of the values bound to the object by the execution of its functions. A user can hover on, click on, or otherwise select any of the cells to view information about their corresponding objects in the secure environment.

Figure 7F:
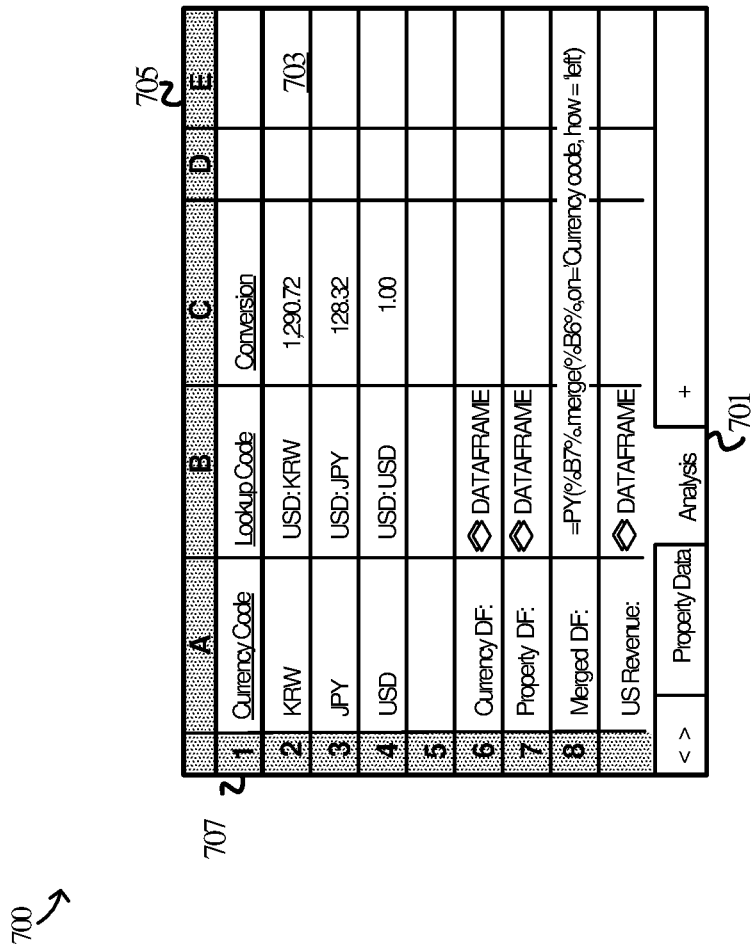

In FIG. 7F, an example is illustrated whereby a PYO-function is replaced by a PY-function. Replacing the PYO-function with the PY-function causes actual values to be obtained from the secure runtime environment. However, since the values consist of a table, the values overflow into adjacent cells of the spreadsheet in a tabular form. Here, some of the adjacent cells are over-written for illustrative effect, although it may be appreciated that error handling or other exceptions could prevent such circumstances. Regardless, the larger notion is that the PY function returns actual values to the worksheet, as opposed to object representations.

FIG. 8 illustrates computing device 801 that is representative of any system or collection of systems in which the various processes, programs, services, and scenarios disclosed herein may be implemented. Examples of computing device 801 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 801 may be implemented as a single apparatus, system, or device or may be implemented in a distributed manner as multiple apparatuses, systems, or devices. Computing device 801 includes, but is not limited to, processing system 802, storage system 803, software 805, communication interface system 807, and user interface system 809 (optional). Processing system 802 is operatively coupled with storage system 803, communication interface system 807, and user interface system 809.

Processing system 802 loads and executes software 805 from storage system 803. Software 805 includes and implements software process 806, which is representative of the processes discussed with respect to the preceding Figures, such as local process 300, integration process 400, and security process 500. When executed by processing system 802, software 805 directs processing system 802 to operate as described herein for at least the various processes, operational scenarios, and sequences discussed in the foregoing implementations. Computing device 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including software process 806) may be implemented in program instructions and among other functions may, when executed by processing system 802, direct processing system 802 to operate as described with respect to the various operational scenarios, sequences, and processes illustrated herein. For example, software 805 may include program instructions for implementing spreadsheet integrations as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing device 801 is representative) overall from a general-purpose computing system into a special-purpose computing system customized to support spreadsheet integrations with external environments and resources. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

Various technical effects may be appreciated from the foregoing discussion. In one, non-native functions can be executed securely outside the runtime of a spreadsheet application, thereby protecting the application and its runtime environment from security vulnerabilities of external programming languages and environments. In another, data need not be passed back and forth between environments, which conserves bandwidth and speeds-up processing time. In contrast, having to port data from a spreadsheet to an external runtime on each cycle of the calculation engine would be cost-prohibitive from a bandwidth and performance standpoint.

The unique user interface aspects disclosed herein also provide a technical effect with respect to ease of use and performance. In particular, being able to input non-native statements and functions directly into a cell improves the speed with which a user can program formulas. In addition, the native functions PYO and PY allow a user to quickly program their formula without having to resort to the complexities of a macro programming environment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

It may be appreciated that, while the inventive concepts disclosed herein are discussed in the context of such productivity applications, they apply as well to other contexts such as gaming applications, virtual and augmented reality applications, business applications, and other types of software applications. Likewise, the concepts apply not just to electronic documents, but to other types of content such as in-game electronic content, virtual and augmented content, databases, and audio and video content.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
   one or more computer readable storage media;
   one or more processors operatively coupled with the one or more computer readable storage media; and
   program instructions stored on the one or more computer readable storage media that, when executed by the one or more processors, direct the computing apparatus to at least:
   receive a call from a spreadsheet application, wherein the call identifies:
     a Python function named in a Python statement inside an argument of a native function named in a formula in a cell of a spreadsheet, wherein the native function is executed by the spreadsheet application and, in the formula, the name of the native function immediately follows an equals sign and comprises PY; and
     a reference to content in the spreadsheet expressed in a format native to the spreadsheet;
   in response to the call, generate Python code to supply to a Python runtime environment distinct from the spreadsheet application, wherein the Python code includes a name of the Python function and includes a reference to the content expressed in a format native to the Python runtime environment;
   supply the Python code to the Python runtime environment to obtain a result produced by the Python runtime environment when executing the Python function with respect to the content; and
   return a representation of the result to the spreadsheet application.

2. The computing apparatus of claim 1 wherein:
   the reference to the content in the spreadsheet, expressed in the format native to the spreadsheet, comprises a string of characters that refer to a range of cells in the spreadsheet;
   the reference to the content expressed in the format native to the Python runtime environment comprises a name of an object generated in a context of the Python runtime environment; and
   the content comprises values in the range of cells in the spreadsheet.

3. The computing apparatus of claim 2 wherein the program instructions further direct the computing apparatus to obtain the content from the spreadsheet and pass the content to the Python runtime environment using the name of the object.

4. The computing apparatus of claim 3 wherein the Python function performs an operation with respect to the content and the result of executing the Python function with respect to the content comprises a modified version of the content.

5. The computing apparatus of claim 4 wherein the representation of the result comprises a unique identifier produced by the Python runtime environment that the spreadsheet application uses during subsequent calls to retrieve values bound to the object.

6. The computing apparatus of claim 1 wherein to return the representation of the result to the spreadsheet application, the program instructions direct the computing apparatus to not return the result to the spreadsheet application.

7. The computing apparatus of claim 1 wherein the spreadsheet application sends the call while executing the native function.

8. One or more computer readable storage media having program instructions stored thereon that, when executed by one or more processors of a computing device, direct the computing device to at least:
   receive a call from a spreadsheet application, wherein the call identifies:
     a Python function named in a Python statement inside an argument of a native function named in a formula in a cell of a spreadsheet, wherein the native function is executed by the spreadsheet application and, in the formula, the name of the native function immediately follows an equals sign and comprises PY; and
     a reference to content in the spreadsheet expressed in a format native to the spreadsheet;
   in response to the call, generate Python code to supply to a Python runtime environment distinct from the spreadsheet application, wherein the Python code includes a name of the Python function and includes a reference to the content expressed in a format native to the Python runtime environment;
   supply the Python code to the Python runtime environment to obtain a result produced by the Python runtime environment when executing the Python function with respect to the content; and
   return a representation of the result to the spreadsheet application.

9. The one or more computer readable storage media of claim 8 wherein:
   the reference to the content in the spreadsheet, expressed in the format native to the spreadsheet, comprises a string of characters that refer to a range of cells in the spreadsheet;
   the reference to the content expressed in the format native to the Python runtime environment comprises a name of an object generated in a context of the Python runtime environment; and
   the content comprises values in the range of cells in the spreadsheet.

10. The one or more computer readable storage media of claim 9 wherein the program instructions further direct the computing device to obtain the content from the spreadsheet and pass the content to the Python runtime environment using the name of the object.

11. The one or more computer readable storage media of claim 10 wherein the Python function performs an operation with respect to the content and the result of executing the Python function with respect to the content comprises a modified version of the content.

12. The one or more computer readable storage media of claim 11 wherein the representation of the result comprises a unique identifier produced by the Python runtime environment that the spreadsheet application uses during subsequent calls to retrieve values bound to the object.

13. The one or more computer readable storage media of claim 8 wherein to return the representation of the result to the spreadsheet application, the program instructions direct the computing device to not return the result to the spreadsheet application.

14. The one or more computer readable storage media of claim 8 wherein the spreadsheet application sends the call while executing the native function.

15. A method of operating a computing system, the method comprising:
    receiving a call from a spreadsheet application, wherein the call identifies:
        a Python function named in a Python statement inside an argument of a native function named in a formula in a cell of a spreadsheet, wherein the native function is executed by the spreadsheet application and, in the formula, the name of the native function immediately follows an equals sign and comprises PY; and
        a reference to content in the spreadsheet expressed in a format native to the spreadsheet;
    in response to the call, generating Python code to supply to a Python runtime environment distinct from the spreadsheet application, wherein the Python code includes a name of the Python function and includes a reference to the content expressed in a format native to the Python runtime environment;
    supplying the Python code to the Python runtime environment to obtain a result produced by the Python runtime environment when executing the Python function with respect to the content; and
    returning a representation of the result to the spreadsheet application.

16. The method of claim 15 wherein:
    the reference to the content in the spreadsheet, expressed in the format native to the spreadsheet, comprises a string of characters that refer to a range of cells in the spreadsheet;
    the reference to the content expressed in the format native to the Python runtime environment comprises a name of an object generated in a context of the Python runtime environment; and
    the content comprises values in the range of cells in the spreadsheet.

17. The method of claim 16 wherein the method further comprises obtaining the content from the spreadsheet and pass the content to the Python runtime environment using the name of the object.

18. The method of claim 17 wherein the Python function performs an operation with respect to the content and the result of executing the Python function with respect to the content comprises a modified version of the content.

19. The method of claim 18 wherein the representation of the result comprises a unique identifier produced by the Python runtime environment that the spreadsheet application uses during subsequent calls to retrieve values bound to the object.

20. The method of claim 15 wherein returning the representation of the result to the spreadsheet application comprises not returning the result to the spreadsheet application.

* * * * *